United States Patent [19]

Stoelwinder et al.

[11] Patent Number: 5,698,662
[45] Date of Patent: Dec. 16, 1997

[54] DENDRITIC MACOMOLECULE AND A PROCESS FOR THE PREPARATION THEREOF

[75] Inventors: Christiaan J. C. Stoelwinder, Sittard; Ellen M. M. de Brabander-van den Berg, Schinnen; Atze J. Nijenhuis, Sittard, all of Netherlands

[73] Assignee: DSM N.V., Heerlen, Netherlands

[21] Appl. No.: 686,948

[22] Filed: Jul. 26, 1996

Related U.S. Application Data

[63] Continuation of PCT/NL95/00032, Jan. 23, 1995.

[30] Foreign Application Priority Data

Jan. 28, 1994 [BE] Belgium ................. 9400100

[51] Int. Cl.$^6$ .................. C08G 63/44; C08G 73/00
[52] U.S. Cl. .............. 528/363; 528/363; 528/422; 524/765; 524/779; 524/781; 524/785
[58] Field of Search .................. 528/363, 422; 524/765, 779, 781, 785

[56] References Cited

U.S. PATENT DOCUMENTS

| 4,507,466 | 3/1985 | Tomalia et al. | 528/332 |
| 4,631,337 | 12/1986 | Tomalia et al. | 528/391 |
| 5,530,092 | 6/1996 | Meijer et al. | 528/363 |
| 5,610,268 | 3/1997 | Meijer et al. | 528/363 |

FOREIGN PATENT DOCUMENTS

WO 93/14147  7/1993  WIPO.

OTHER PUBLICATIONS

De Brabander–Van den Berg et al., 'Poly(propylene imine) Dendrimers: Large–scale Synthesis by Hetereogeneously Catalyzed Hydrogenations', Angewandte Chemie. International Edition, vol. 32, No. 9, 1993, Weinheim De, pp. 1308–1311.

*Primary Examiner*—Samuel A. Acquah
*Attorney, Agent, or Firm*—Cushman Darby & Cushman IP Group of Pillsbury Madison & Sutro, LLP

[57] ABSTRACT

The invention relates to a dendritic macromolecule with branches prepared from halogen cyanide units composed of a monohalogenated hydrocarbon compound comprising 3–50 carbon atoms and at least one cyanide group, the halogen and the cyanide group being separated from one another by at least 3 carbon atoms. The invention also relates to a process for the preparation of a dendritic macromolecule, comprising a core and at least one branch emanating from the core, characterized in that the process comprises the steps a) through c):

a) substantially every functional group of the core molecule is reacted with monomeric halogen cyanide units
b) substantially every incorporated cyanide group is reduced to an amine
c) substantially every amine group is reacted with monomeric halogen cyanide units,
steps b) and c) being conducted alternately.

19 Claims, No Drawings

DENDRITIC MACOMOLECULE AND A PROCESS FOR THE PREPARATION THEREOF

This is a continuation of International Appln. No. PCT/NL95/00032 filed Jan. 23, 1995 which designated the U.S.

The invention relates to a dendritic macromolecule comprising a core and branches emanating from the core and a process for the preparation thereof.

WO-A-9314147 describes a dendritic macromolecule comprising a core and branches, the branches being built up of propylamine units. WO-A-9314147 also describes a process for the preparation of a dendritic macromolecule, wherein a diamine, for example 1,4-diaminobutane, is reacted in a Michael-addition reaction with a vinyl cyanide, yielding a cyanide terminated reaction product. After removal of the excess acrylonitrile, the cyanide terminated reaction product is hydrogenated with hydrogen to an amine terminated reaction product. Both reactions are repeated alternately, so that a dendritic macromolecule with increasing generation is obtained.

The dendritic macromolecule described in WO-A-9314147 has the disadvantage that the branches are always composed of eventually substituted propylamine units or derivatives thereof. The dendritic macromolecule described in WO-A-9314147 has the additional disadvantage that variation of the chemical composition and structure of the branches in successive generations is possible only to a limited extent.

The object of the invention is to provide a dendritic macromolecule in which the length of the branches can be increased and in which the chemical composition and structure of the branches in successive generations can be varied.

This is achieved according to the invention in that the branches are prepared from halogen cyanide units composed of a monohalogenated hydrocarbon comprising 3–50 carbon atoms and at least 1 cyanide group, the halogen and the cyanide group being separated by at least three carbon atoms.

The advantage of the dendritic macromolecule according to the invention is that the length, the chemical composition and chemical structure of the branches and the degree of branching can be varied in each generation.

Dendritic macromolecules according to the invention are prepared via alternate reaction steps, starting from a core molecule or initiator core. The reactions occurring during the synthesis proceed usually almost complete and selective. Hardly any undesirable side reactions occur, so that a dendritic macromolecule with an exactly defined chemical structure is obtained.

The molecules which can be used as core molecules according to the invention are molecules containing at least one functional group. Within the scope of the invention a functional group is a group which - in the presence of a suitable catalyst if so desired - acts as nucleophilic reagent in a nucleophilic substitution on a halogen cyanide. Possible nucleophilic groups are a hydroxyl group, a thiol group, primary, secondary or tertiary amines and carbon atoms forming a conjugated system with one or more electronegative groups. The nucleophilic group according to the invention is preferably a primary or secondary amine.

Depending on the functional group's nature, it can react with one or more halogen cyanide units. If a functional group can react with r halogen cyanide units, it has r reactive sites. A secondary amine group can react with one halogen cyanide and thus has one reactive site. A primary amine group can react with two halogen cyanide units and thus has two reactive sites.

Mostly, each functional group of the core molecule with r reactive sites can be made to react with a number of halogen cyanide units which is smaller than or equal to the number of reactive sites r.

The molecules which according to the invention can be used as halogen cyanide unit are monohalogenated hydrocarbons with 3–50 C-atoms, which in addition contain one or more cyanide groups, the halogen and the cyanide group being separated by at least 3 carbon atoms. Under this definition the carbon atom of the cyanide group does not form part of the 3–50 C-atoms of the hydrocarbon compound. The hydrocarbon compound is a saturated or unsaturated, linear or cyclic aliphatic group comprising at least three C-atoms. The hydrocarbon compound preferably has 3–15 C-atoms more preferably 3–7 C-atoms. The hydrocarbon compound may be branched or not.

The hydrocarbon compound may contain one or more substituents. These substituents should be inert with respect to the nucleophilic substitution reaction. Possible substituents are for example amide, ester and nitro groups.

The halogen cyanide unit preferably contains chlorine or bromine as halogen.

The halogen cyanide unit according to the invention generally contains 1–20 cyanide groups, preferably 1–5 cyanide groups, more preferably the halogen cyanide unit contains 1, 2 or 3 cyanide units.

Examples of suitable aliphatic chlorocyanides are mono-, di- and polycyanides of n-propyl chloride, n-butyl chloride, isobutyl chloride, pentyl chloride, isopentyl chloride, neopentyl chloride, hexyl chloride, heptyl chloride, octyl chloride, nonyl chloride, decyl chloride. Examples of aliphatic bromocyanides are mono-, di- and polycyanides of n-propyl bromide, isobutyl bromide, n-butyl bromide, pentyl bromide, isopentyl bromide, neopentyl bromide, hexyl bromide, heptyl bromide, octyl bromide, nonyl bromide, decyl bromide. Examples of suitable cycloaliphatic cyanides are chloromethylenecyclohexyl cyanide, bromomethylenecyclohexyl cyanide, chloromethylenecyclopentyl cyanide, bromomethylenecyclopentyl cyanide.

In a first preferred embodiment of the invention, a core molecule preferably contains 1–10 functional groups. A suitable core molecule can be chosen from, for example, the group comprising ammonia, water, methanol, polymethylene diamines, such as hexamethylene-diamine, ethylenediamine and 1,4-diaminobutane (DAB), diethylenetriamine, triethylenetetramine, tetraethylenepentamine, linear and branched polyethyleneimine, methylamine, hydroxyethylamine, octadecylamine, polyaminoalkylarenes, for example, 1,3,5-tris (aminomethyl)-benzene, tris(aminoalkyl)amines, such as tris(aminoethyl)amine, heterocyclic amines, for example imidazolines and piperidines, hydroxyethylaminoethylamine, mercaptoethylamine, morpholine, piperazine, pentaerythritol, polyalkylene polyols, for example polyethylene glycol and polypropylene glycol, glycols, for example ethylene glycol, polyalkylene polymercaptans, 1,2-dimercaptoethane, phosphine, ε-aminocaproic acid, glycine, thiophenols, phenols, melamine and derivatives thereof, for example melaminetris(hexamethylene-diamine). Preferably, in the process according to the invention a core is used which is chosen from the group comprising polymethylenediamines, glycols and tris(1,3,5-aminomethyl)benzene. More preferably, 1,4-diaminobutane is used as core molecule.

According to a second preferred embodiment of the invention a (co)polymer, which contains one of more of the above functional groups, is used as core for the dendritic macromolecule. Examples of such (co)polymers are styrene-maleimide copolymers, styrene-acrylonitrile copolymers, polyethyleneimine and polymers such as for example polypropylene oxide, polystyrene and ethylene-propylene-diene copolymers, which are functionalized with one or more of the above functional groups, such as for example $NH_2$-groups.

According to a third preferred embodiment of the invention dendrimers of a low generation, for example the first, second and/or third generation, described in U.S. Pat. No. 4,507,466, WO-A-9314147 and F. Vögtle et al., Synthesis, February 1978, p. 155–158, are used as core for the dendritic macromolecule. In this case in particular, the functionality of the core molecule may be very high, 10–40 amine groups may be present, for example. The molecular weight of such core molecules is mostly higher than 200 and mostly lower than 5,000.

From the core a number of branches prepared from halogen cyanide units emanate. If the reactions that occur proceed to completion, the total number of branches of the desired generation n can be calculated as follows. If g is the number of functional groups contained in the core, and r the number of reactive sites of each individual functional group, then the number of reactive sites of the core ($r_c$) equals the sum of the reactive sites r of all functional groups. The maximum number of branches of the $n^{th}$ generation can be described as the number of reactive sites $r_c$ multiplied by $r^{n-1}$. If the reactions that occur do not proceed to completion, the number of branches will be smaller and will lie between $r_c$ and ($r_c * r^{n-1}$).

The dendritic macromolecule mostly contains 1–10 generations of branches, preferably 2–10, in particular 3–9.

The molecular weight of the dendritic macromolecule according to the invention is mostly higher than 350, in particular higher than 1,000. The molecular weight is mostly lower than 100,000, in particular lower than 50,000.

The dendritic macromolecule according to the invention has the advantage that the molecular weight of each generation can be predetermined. This can generally be achieved by varying among other things, the number of carbon atoms in the hydrocarbon chain of the halogen cyanide, the degree of branching, the number of cyanide groups and the nature and number of the substituents in two or more successive generations.

The shape of the dendritic macromolecule is in part determined by the shape of the core molecule. If a small molecule or a spherical dendrimer is used as core molecule, a spherical dendritic macromolecule can be obtained.

The shape of the dendritic macromolecule is also determined by the degree of branching, the length of the branches in the individual generations and the number of generations of which the dendritic macromolecule is composed.

The dendritic macromolecule according to the invention has the advantage that the number of branches can be varied in each generation. This can for example be achieved by varying the number of cyanide groups in the halogen cyanide unit. If the halogen cyanide unit is a monocyanide, for example, the number of branches doubles with each generation. If desired, the degree of branching can be increased further by preparing the branches for example from a halogen cyanide which contains for example two cyanide groups or more.

The dendritic macromolecule according to the invention can also comprise one or more generations with a lower degree of branching. This can be achieved by, among other things, not allowing every reactive site of a functional group to react.

The invention has the additional advantage of the density of the dendritic macromolecule being adjustable.

The dendritic macromolecule according to the invention preferably comprises one or more generations prepared from different halogen cyanide units. These branches can differ from one another as regards chemical composition and/or structure.

It is possible, for example, that the first generation of the dendritic macromolecule is prepared from a halogen cyanide with an unbranched hydrocarbon chain comprising $m_1$ carbon atoms, the second generation is prepared from a halogen cyanide with a branched hydrocarbon chain comprising $m_2$ carbon atoms, with $m_1 \neq m_2$. The third generation of the dendritic macromolecule is for example prepared from a halogen cyanide with an unsaturated hydrocarbon chain comprising $m_3$ carbon atoms, which in addition contains a nitro group as substituent, with $m_1 \neq m_2 \neq m_3$.

As described in the foregoing, the dendritic macromolecule according to the invention is composed of a core and branches. The branches of the dendritic macromolecule contain units that correspond to formula 1:

$$-CH_2-\begin{bmatrix} R_i^2 \\ | \\ C \\ | \\ R_i^3 \end{bmatrix}_m -R^4 \qquad \text{(formula 1)}$$

where i=1, 2 . . . m $R_i^2$ and $R_i^3$ are H or either a linear or cyclic aliphatic, aromatic, amide, ester or nitro group, $R_i^2$ and $R_i^3$ being the same or different, and $R_i^2$ and $R_i^3$ in different generations being the same or different $m \geq 2$, whereby m in two successive generations can be the same or different

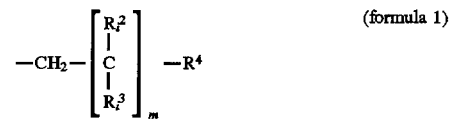

$R^5$ is H or a unit of the next generation
$R^6$ is H or a unit of the next generation,
where $R^5$ and $R^6$ in each

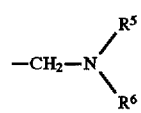

group and in each generation may be the same or different.

The dendritic macromolecule generally contains at least four units corresponding to formula 1, preferably more than six, and in particular more than 10 units according to formula 1.

The dendritic macromolecule preferably contains at least one generation of units that correspond to formula 1. More preferably, the dendritic macromolecule contains at least two generations (k,l) of units that correspond to formula 1, it being particularly preferred for $m_k$ in generation k to differ from $m_l$ in generation l.

As described in the foregoing, the dendritic macromolecule according to the invention is built up of a core and branches whereby the branches are built up of alkylamine units that contain 4–51 carbon atoms, wherein the linear part of the alkyl chain contains at least 4 carbon atoms and wherein the alkyl chain may be branched or not.

U.S. Pat. No. 4,631,337 describes dense star polyamines, wherein the repeating unit contains alkylene amine units having from 2 to 6 carbon atoms. The polyamines described in U.S. Pat. No. 4,631,337 are prepared using the so-called protected reactant method, wherein a N-protected aziridine or azetidine is first reacted with an amine, after which the protective group is removed and an amine terminated reaction product is obtained. The amine terminated reaction product can again be reacted with respectively a N-protected aziridine or azetidine, to produce a dendrimer of the next generation. The process described in U.S. Pat. No. 4,631,337 can be suitably used for the preparation of polyethyleneamines or polypropyleneamines. The process described in U.S. Pat. No. 4,631,337 however is not suited for the preparation of polyalkyl-amines with 4 or more carbon atoms in the linear part of the alkyl chain, since the reagents needed in such a process such as pyrolidine and piperidine are inert and will not undergo the required ring opening reactions under the described reaction conditions.

The present invention also relates to a process for the preparation of dendritic macromolecule comprising the steps a) through c):
a) substantially every functional group of the core molecule is reacted with monomeric halogen cyanide units
b) substantially every incorporated cyanide group is hydrogenated to an amine
c) substantially every amine group is reacted with monomeric halogen cyanide units, steps b) and c) being conducted alternately,
whereby the process can be interrupted either after step a), b) or c).

In the context of the present invention, substantially means at least 50%, preferably at least 80%, more preferably at least 90%.

According to the invention it is also possible to conduct, in an interim step, instead of step c), a Michael addition reaction with a vinyl cyanide, as for example described in WO-A-9314147.

Suitable vinyl cyanide units are for example described in WO-A-9314147. Particularly suitable vinyl cyanide units which can be used according to the invention are acrylonitrile, methacrylonitrile and fumarodinitrile.

According to the invention it is also possible to allow part of the reactive sites of an amine-terminated dendrimer to react with a first vinyl cyanide unit and subsequently allow the remaining reactive sites to react with a second vinyl cyanide, whereby the first and second vinylcyanide for example have a different chemical composition or structure. It is possible, for example, to allow an amine-terminated dendrimer of generation 1½ to first react with fumarodinitrile and subsequently with acrylonitrile.

Steps b) and c) are conducted alternately (n−1) times to obtain a macromolecule of the desired generation n. The value of n usually varies from 1 to 10, preferably n has a value of 2 or higher, in particular 3 or higher.

To obtain a dendritic macromolecule of a particular generation, the above-mentioned nucleophilic substitution reaction and/or Michael addition reaction and the hydrogenation reaction are alternately repeated a number of times. After one nucleophilic substitution reaction a molecule of the first generation is obtained. After alternately conducting three substitution and/or addition reactions and two hydrogenation reactions a dendritic macromolecule of the third generation is obtained.

It is possible to stop the process after a reaction step b). This yields an amine terminated dendritic macromolecule of generation $1^{1/2}$, $2^{1/2}$ or higher.

It is possible to react each functional group with r reactive sites with r halogen cyanide units or less. It is possible, for example, to react a primary amine group with two halogen cyanide units. It is also possible to react a primary amine group with one halogen cyanide unit. In the latter case, the degree of branching of dendritic macromolecule does not increase; the existing branches will only become longer.

It is also possible to react a primary amine group with a first halogen cyanide unit and subsequently react the secondary amine group thus formed with a second halogen cyanide unit, whereby the first and the second halogen cyanide units have different chemical composition and/or chemical structure.

The nucleophilic substitution is generally carried out in solution. To this end, an amount of the core molecule or the amine terminated dendritic macromolecule is dissolved in a solvent. The solvent is chosen so that the desired reactions are most favourably influenced and undesired side reactions do not take place. It is thus important that under the conditions chosen the solvent does not react with the reagents, the functional groups of the core-molecule or the dendritic macromolecule.

A nucleophilic substitution reaction can generally be conducted in both protic and aprotic solvents. Suitable examples of protic solvents are water, alcohols and carboxylic acids. Suitable examples of aprotic solvents are dimethylformamide, dimethylsulphoxide, acetonitrile, N-methylpyrrolidone, sulphur dioxide, hexamethylphosphoramide. To obtain the desired polarity, mixtures of several solvents can be used. The solvent is preferably an alcohol, more preferably ethanol.

The molar ratio of the amount of halogen cyanide relative to the number of reactive sites of the core is generally at least 0.5 and usually not higher than 20, preferably the ratio is between 1 and 5.

To increase the reaction rate of the nucleophilic reaction a salt can be added. In general an alkali metal halide is used as salt, preferably an alkali metal iodide, more preferably sodium or potassium iodide. The alkali metal iodide is generally added in a molar ratio of 0.05 to 0.5 mole %, preferably 0.05–0.20 mole % with respect to the halogen cyanide.

Often, a base is added during the nucleophilic substitution reaction, for example sodium or potassium carbonate. The ratio of the base to the halogen cyanide is generally at least 0.5 and mostly not higher than 3 equivalents.

The nucleophilic substitution according to the invention is mostly carried out at an elevated temperature. In a preferred embodiment the nucleophilic substitution is conducted at a temperature which is approximately equal to the boiling point of the solvent used. The temperature at which the nucleophilic substitution is carried out mostly lies between 0° and 200° C., preferably between 0° and 200° C., most preferably between 65° and 90° C.

The nucleophilic substitution is mostly conducted at atmospheric pressure. The nucleophilic substitution can also be conducted at elevated pressure.

Mostly, the product obtained from the nucleophilic substitution is purified. This can be done by, for example, a distillation or an extraction.

The cyanide group of the cyanide terminated reaction product thus formed is subsequently hydrogenated to an amine group via a hydrogenation reaction.

The solvent used in the hydrogenation according to the invention is an alcohol that contains an amount of ammonia, the molar ratio of ammonia relative to the number of cyanide groups being higher than 0.8. Minimal poisoning of the catalyst used in the hydrogenation reaction can be achieved if the molar ratio of ammonia relative to the number of cyanide groups is lower than 50. Mostly, the hydrogenation reaction proceeds with good selectivity if the molar ratio of ammonia relative to the number of cyanide groups is lower than 20.

Suitable alcohols are for example low-boiling alcohols, such as methanol, ethanol, isopropanol and the like. If desired, a mixture of different alcohols can be used. The alcohol is preferably methanol. If desired, a mixture of one or more alcohols and water can be used.

The water:alcohol weight ratio mostly lies between 1:50 and 2:1. The water: alcohol weight ratio preferably lies between 1:10 and 1:1.

The hydrogenation reaction can for example take place through reaction of the incorporated cyanide groups with $H_2$-gas. If a complete hydrogenation is desired, the molar ratio of $H_2$ to cyanide groups should be at least 2. If this molar ratio is lower than 2 no full hydrogenation takes place.

The hydrogenation step is mostly carried out in the presence of a suitable catalyst. In general a hydrogenation catalyst is used, preferably a heterogeneous hydrogenation catalyst.

The catalyst which can be suitably used according to the invention comprises for example a metal from group VIII of the periodic system of elements as depicted in Handbook of Chemistry and Physics, CRC Press 70th edition 1989–1990. Nickel, cobalt, platinum, palladium and rhodium can readily be used. In order for the catalyst to have a high catalytic activity, it should preferably have a large active metal surface area. The metal can be used as such or on a suitable support.

Raney nickel or Raney cobalt as for example described in U.S. Pat. No. 1,628,190 are suitable as catalyst for the hydrogenation according to the invention.

Raney nickel mainly comprises nickel and aluminium, the latter in the form of metallic aluminium, aluminium oxides and/or aluminium hydroxides. To the Raney nickel small amounts of other metals can be added, such as iron and/or chromium, in elemental or bound form, to enhance the activity and selectivity for the hydrogenating of certain groups of compounds. A Raney cobalt catalyst contains aluminium and may be provided with promoters. If desired, the catalyst may be washed, for example with the solvent of the hydrogenation reaction, with an alcohol, with a mixture of various alcohols or a mixture of water and one or more alcohols. Suitable alcohols are for example methanol, ethanol, isopropanol and the like.

The optimal amount of catalyst that can be used in the reactor in the hydrogenation of the cyanide-terminated product depends on the reactor type used. A person skilled in the art can easily determine the appropriate amount of catalyst for any desired reactor.

Mostly, in the process according to the invention the weight ratio of the required amount of catalyst (dry) to the weight of the dendritic macromolecule is higher than 10%. The required amount of catalyst (dry) with respect to the weight of the cyanide-terminated dendritic macromolecule is preferably more than 12% and less than 50%.

The amount of cyanide-terminated product with respect to the total weight of the reaction mixture, that can be used in the hydrogenation reaction according to the invention is mostly at least 10 wt. %, preferably at least 20 wt. %.

The hydrogenation reaction can for example be conducted in a closed reactor under a $H_2$-atmosphere. The total pressure in the reactor is mainly the result of the hydrogen and ammonia present at a particular temperature and lies mostly between 0.1 and 500 MPa, preferably between 1 and 20 MPa and most preferably between 1 and 10 MPa. The hydrogen pressure prevailing in the reactor is mostly more than 0.1 MPa, preferably more than 1 MPa.

The reaction temperature is not critical and lies mostly between 0° and 200° C., preferably between 10° and 150° C., more preferably between 50° and 110° C. After the hydrogenation reaction a product that contains terminal amine groups is obtained.

After of the hydrogenation reaction is terminated, the catalyst is often separated from the reaction mixture. This can be achieved for example by cooling the reactor under a $H_2$-atmosphere and, after discharging the $H_2$, purging the reactor with inert gas and filtering the reactor contents. The filtrate contains the dendrimers in solution.

It is also possible to filter off the catalyst in a $H_2$-atmosphere. This can be done, for example, by placing a so-called filter candle in the reactor, which is a filter from sintered metal. The filtrate is removed from the reactor via the inner space of the filter, while the catalyst remains in the reactor on the outside of the filter. The advantage of this method is that the reactor can remain pressurized so that several hydrogenation reactions can be conducted in succession and hydrogen deficiency of the catalyst is avoided.

With the process according to the invention it is also possible to use a regenerated catalyst. The catalyst can for example be regenerated by treating a used catalyst with a caustic solution, for example a solution of NaOH in water, for a few hours, at a temperature of between 50° and 70° C. After filtering, the catalyst is subsequently washed with deionized water until the pH of the wash water is approximately neutral. The catalyst is stored under water.

The dendritic macromolecule obtained can be wholly or partially modified with all kinds of functional groups if so desired. This can be achieved by, for example, wholly or partially reacting the amine or cyanide groups present with suitable reagents, optionally in the presence of a suitable catalyst. Examples of such reagents are $\alpha,\beta$-unsaturated compounds substituted with electronegative groups, unsaturated aliphatic esters and amides, such as acrylic ester, methacrylic ester, crotyl ester, methylvinyl ketone, acrolein and acrylic amide, polyamides such as nylon 4,6, nylon 6, nylon 6,10, nylon 8, epoxides such as ethylene oxide and propylene oxide, acid halides, such as acid chlorides, acryloyl chloride, stearic acid chloride, epichlorohydrin, alkyl halides such as ethylbromoacetate and allyl bromide, aryl halides such as benzylchloride, tosyl halides such as tosyl chloride, anhydrides such as phthalic anhydride, glutaric anhydride, dicarboxylic acids such as terephthalic acid, adipic acid, chlorosulphonic acid, diols, (a)cyclic aldehydes such as formaldehyde, acetaldehyde, hexanal, aromatic aldehyde such as benzaldehyde, pentafluorobenzaldehyde and paramethoxy-benzaldehyde, pyridine-aldehydes, p-formylphenylacetic acid and 1,4,5,8-naphthalenetetraacetaldehyde, ketones such as derivatized cyclohexanones (e.g. HALS compounds), lactones, such as caprolactone, isocyanates such as stearoylisocyanate phosphate esters as for example described in U.S. Pat. No. 3,855,364, molecules with a chiral centre such as lactide and activated amino acids. However, this list is by no means exhaustive and is therefore non-limiting.

The dendritic macromolecules according to the invention can be used in many applications.

In Angew. Chem. Int. Ed. Engl. 29 (1990), pp. 138–175 various possible applications of dendritic macromolecules are mentioned, for example the use of dendritic macromolecules to calibrate sieves, as catalyst (carriers), as selective membranes, the use of dendritic macromolecules in the electronics sector and in coatings, but the use of dendritic macromolecules as impact modifier or as crosslinking agent in various plastics is also conceivable.

The invention will be elucidated with reference to the examples below, without being limited thereto.

EXAMPLES

Example I 15 ml of ethanol and 2.3 g of 1,4-diaminobutane (DAB) were introduced into a 50-liter three-neck flask equipped with a stirrer and a reflux condenser. To this mixture 16.2 g of 4-chlorobutyronitrile (CBN, 1-chloropropane-3-cyanide), 200 mg of sodium iodide and 7.9 g of potassium carbonate were added. The reaction mixture thus obtained was heated at 78° C. under hydrogen for 72 hours. The reaction product was isolated by evaporating the ethanol, upon which the residue was dissolved in 75 ml of dichloromethane and dried over sodium sulphate, filtered off, and subsequently heated at 100° C. for 30 minutes to remove the excess 4-chlorobutyronitrile. The yield was 69%.

The isolated product was analyzed with the aid of IR $^1$H- and $^{13}$C-NMR and mass spectrometry, which revealed that the product was 4-cascade:1,4-diaminobutane[4]-butyronitrile (DAB(($CH_2$)$_3$CN)$_4$).

Example II 5,6 grams of Raney cobalt catalyst (wet) (type Grace 2724 from the Grace company (according to the manufacturer the composition contains 78–96 wt. % Co, 0.5–5 wt. % Cr, 0.5–5 wt. % Ni and 3–12 wt. % Al)) were washed once with 25 ml of methanol at a temperature of 20° C. Next, the catalyst was transferred to the autoclave, upon which methanol was added to a total methanol weight of 52.7 grams. Finally, about 22.7 grams of DAB(($CH_2$)$_3$CN)$_4$ in powdered form were added. About 15 wt. % of dry catalyst was added, referred to DAB(($CH_2$)$_3$CN)$_4$.

After closing the autoclave, stirring of the reaction mixture was started and the autoclave was purged three times with $N_2$-gas and three times with $H_2$-gas. After pressure-relieving, about 6.5 grams of liquid ammonia were dosed to the autoclave. The molar ratio of ammonia and DAB(($CH_2$)$_3$CN)$_4$ was about 4.9. The autoclave was subsequently heated to 65° at a $H_2$-pressure of 80 bar, with stirring.

The reaction was stopped after 20 minutes and the autoclave was cooled to room temperature under hydrogen. Next, the $H_2$ was discharged, the autoclave was purged three times with $N_2$-gas, and upon opening of the autoclave the contents were immediately filtered.

The isolated product was analyzed with the aid of $^{13}$C NMR spectroscopy, which revealed that the product obtained was 4-cascade:1,4-diaminobutane[4]-butylamine (DAB(($CH_2$)$_4$NH$_2$)$_4$). The conversion was virtually complete.

Example III

The procedure described in Example I was repeated, 3 g of 1,6-diaminohexane (DAH) being dissolved as substrate in 25 ml of ethanol. To this mixture 16.2 g of 4-chlorobutyronitrile (CBN), 200 mg of sodium iodide and 7.9 g of potassium carbonate were added. The reaction mixture thus obtained was heated for 48 hours at 78° C. under a hydrogen atmosphere. The conversion of DAH was 100%.

The reaction product was isolated by adding 75 ml of water to the reaction mixture, followed by three extractions with 50 ml of ether. After washing with 30 ml of water, drying over sodium sulphate, evaporation and 30 minutes' heating at 100° C. to remove the excess 4-chlorobutyronitrile, the yield was 62%.

The isolated product was analyzed with the aid of $^1$H- and $^{13}$C-NMR and mass spectrometry, which revealed that the product was 4-cascade:1,4-diaminohexane[6]:butyronitrile (DAH(BN)$_4$).

$^{13}$C-NMR (CDCl$_3$), DAH(BN)$_4$:119.796 ppm (CN 4x); 53.519 ppm (CH$_2$H 2x); 52.034 ppm (NCH$_2$CH$_2$CH 4x); 27.331 ppm (NCH$_2$CH$_2$CH$_2$CH$_2$ x); 26.816 ppm (NCH$_2$CH$_2$CH$_2$CH$_2$ 2x); 23.226 ppm (NCH$_2$CH$_2$CH$_2$CH 4x ); 14.7 ppm (CH$_2$CN 4x ).

Example IV

Example I was repeated, 2 g 4-cascade: 1,4-diaminobutane[4]propylamine (DAB(PA)$_4$) being used as substrate. 7.9 g of 4-chlorobutyronitrile and 114 mg of sodium iodide and 3.9 g of potassium carbonate were added to the reaction mixture. The reaction mixture thus obtained was heated at 78° C. for 72 hours under hydrogen.

The reaction product was isolated by evaporating ethanol, dissolving the residue in 75 ml of dichloromethane, filtering and after-drying over sodium sulphate. Next, the dichloromethane was evaporated. The excess 4-chlorobutyronitrile was removed by heating at 100° C. for 30 minutes. The yield was 69%.

The isolated product was analyzed with the aid of $^1$H- and $^{13}$C-NMR and mass spectroscopy, which revealed that the product was 8-cascade:1,4-diaminobutane[4]:(1-azabutylidene)$^4$:butyronitrile (DAB(PA)$_4$[(CH$_2$)$_3$CN]$_8$).

$^{13}$C-NMR (CDCl$_3$); DAB(PA)$_4$(($CH_2$)$_3$CN)$_8$: 119.83 ppm (CN 8x), 53.86 (NCH$_2$CH$_2$CH$_2$CH$_2$ 2x); 51.998 ppm (NCH$_2$CH$_2$CH$_2$N 4x and NCH$_2$CH$_2$CH$_2$CH 9x); 51.551 ppm (NCH$_2$CH$_2$CH$_2$N 4x); 24.912 ppm (NCH$_2$CH$_2$CH$_2$ 2x); 24.404 (NCH$_2$CH$_2$CH$_2$N 4x); 23.128 ppm (NCH$_2$CH$_2$CH$_2$CN 8x ).

Example V

Example II was repeated, 11.23 grams of Raney cobalt catalyst (wet) being washed once with about 25 ml of methanol at a temperature of 20° C., and subsequently transferred to the autoclave, upon which methanol was added to a total methanol weight of 50 grams. Finally, about 29.5 grams of DAB(PA)$_4$(($CH_2$)$_3$CN)$_8$ were added. About 24.9% catalyst referred to DAB(PA)$_4$(($CH_2$)$_3$CN)$_8$ was added. About 4.5 grams of liquid ammonia was dosed to the autoclave. The molar ratio of ammonia to DAB(PA)$_4$(($CH_2$)$_3$CN)$_8$ was about 8.5. DAB(PA)$_4$(($CH_2$)$_3$CN)$_8$ was reduced to DAB(PA)$_4$(BA)$_8$ (8-cascade:1,4-diaminobutane[4]:(1-azabutylidene)$_4$:butylamine) in 200 minutes at 46° C. and a $H_2$ pressure of 80 bar.

The isolated product was analyzed with the aid of $^{13}$C-NMR spectroscopy, which revealed that the product obtained was DAB(PA)$_4$(BA)$_8$.

Example VI

Example IV was repeated, about 1 mmol DAB(PA)$_4$(BA)$_8$ being used as substrate. 3 g of 7-bromoheptanenitrile (HN), 25 mg of sodium iodide and 0.75 g of potassium carbonate were added to the reaction mixture. The conversion was 100%.

The reaction product was isolated as described in Example I. To remove the excess 7-bromoheptanenitrile the residue was heated at 130° C. for 2 hours. The yield of DAB(PA)$_4$(BA)$_8$(HN)$_{16}$ was about 95%.

The isolated product was analyzed with the aid of $^1$H- and $^{13}$C-NMR and mass spectrometry, which revealed that the product was DAB(PA)$_4$(BA)$_8$(HN)$_{16}$.

Example VII

Example IV was repeated, about 2 g of 16-cascade:1,4-diaminobutane[4]:(1-azabutylidene)$^{12}$:-propylamine (DAB (PA)$_{16}$) being dissolved as substrate in 15 ml of ethanol, to which about 5.9 g of 4-chlorobutyronitrile, 2.9 g of potassium carbonate and 86 mg of sodium iodide were added. The conversion was 100%. The reaction product was isolated as described in Example I. The yield was 76%.

The isolated product was analyzed with the aid of $^1$H- en $^{13}$C-NMR and mass spectrometry, which revealed that the product was (DAB)(PA)$_{16}$((CH$_2$)$_3$CN)$_{32}$.
$^{13}$C-NMR (in CDCl$_3$); DAB(PA)$_{16}$(CH$_2$)$_3$CN$_{32}$:120 ppm (CN 32x); 52 ppm (NCH2 90x); 24.34 ppm (NCH$_2$CH$_2$CH$_2$N 30x), 23.125 ppm (NCH$_2$CH$_2$CH$_2$CH 32x); 14.725 ppm (CH$_2$CH 32x).

Example VIII

Example I was repeated, 0.5 g of 4-cascade:1,4-diaminobutane[4]:butylamine (DAB(BA)$_4$) being dissolved as substrate in 15 ml of ethanol, to which 3.6 g of 7-bromoheptanenitrile (HN), 40 mg of sodium iodide and 0.96 g of potassium carbonate were added. The conversion was 100%.

The reaction product was isolated as described in Example I. To remove the excess 7-bromoheptanenitrile the residue was heated at 130° C. for 2 hours. The yield of DAB(BA$_2$)$_4$(HN)$_8$ was 1.98 g (100%).

The isolated product was analyzed with the aid of $^1$H- and $^{13}$C-NMR and mass spectrometry, which revealed that the product was (DAB)(BA)$_4$(HN)$_8$.

Example IX

Example VIII was repeated, 1 g of DAB(PA)$_{16}$ being used as substrate, to which 5.4 g of 7-bromo-heptanitrile, 50 mg of sodium iodide and 1.44 g of potassium carbonate were added. The conversion was 100%.

The reaction product was isolated as described in Example I. The yield of DAB(PA)$_{16}$(HN)$_{32}$ was 3.2 g (~100%).

The isolated product was analyzed with the aid of $^1$H- and $^{13}$C-NMR and mass spectrometry, which revealed that the product was (DAB)(PA)$_{16}$(HN)$_{32}$.
$^{13}$C NMR (CDCl$_3$), DAB(PA)$_{16}$(HN)$_{32}$; 119.948 ppm (CH 32x). 50 ppm (N-CH$_2$ 90x); 30–20 ppm (CH$_2$CH$_2$CH$_2$ 94x); 17.01 ppm (CH$_2$CH 32x).

Example X 1 equivalent of DAB(BA)$_4$ was dissolved in a 10-fold excess of tetrahydrofuran, to which a catalytic amount of water was added. Via a dropping funnel 4.4 equivalents of fumarodinitrile (FCN$_2$) dissolved in a 30-fold excess of tetrahydrofuran, were added dropwise, with stirring. N$_2$ was passed through the ice-water-cooled dendrimer solution. After all fumarodinitrile had been added the mixture was stirred for 1 hour at 1° C. After reaction tetrahydrofuran was removed by evaporation. The conversion was 100%.

The isolated reaction product was analyzed with the aid of $^1$H- and $^{13}$C-NMR and mass spectrometry and was found to be DAB(BA)$_4$((FCN$_2$)$_4$.

Next, 1 equivalent of DAB(BA)$_4$(FCN$_2$)$_4$ was dissolved in tetrahydrofuran to which 4.4 equivalents of acrylonitrile (ACN) were added as described above. The conversion was about 90%.

The isolated reaction product was analyzed with the aid of $^1$H- and $^{13}$C-NMR and mass spectrometry and was found to be DAB(BA)$_4$((FCN$_2$)$_4$(ACN)$_4$).

Example XI

The product obtained in Example X DAB(BA)$_4$((FCN$_2$)$_4$(ACN)$_4$) was hydrogenated as described in Example V.

To this end, about 30 g of DAB(BA)$_4$((FCN$_2$)$_4$(ACN)$_4$) were introduced into the reactor. About 30% catalyst referred to DAB(BA)$_4$((FCN$_2$)$_4$(ACN)$_4$) was added. The molar ratio of ammonia to DAB(BA)$_4$((FCN$_2$)$_4$(ACN)$_4$) was about 9.

The isolated product was analyzed with the aid of $^{13}$C-NMR spectrometry, which revealed that the product obtained was

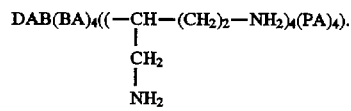

We claim:

1. A dendritic macromolecule comprising a core and branches emanating from the core, wherein the branches are prepared via a nucleophilic substitution reaction from halogen cyanide units comprising a monohalogenated hydrocarbon compound with 3–50 carbon atoms, a halogen, and at least one cyanide group, the halogen and the cyanide group being separated from one another by at least 3 carbon atoms.

2. A dendritic macromolecule according to claim 1, wherein the halogen cyanide unit comprises 1–20 cyanide groups.

3. A dendritic macromolecule according to any one of claims 1–2, wherein the halogen is chlorine or bromine.

4. A dendritic macromolecule comprising a core and branches emanating from the core, wherein, the branches are built up of alkylamine units that contain 4–51 carbon atoms, wherein the alkylamine units each includes an alkyl chain with a linear part containing at least 4 carbon atoms, and wherein the alkyl chain may be branched or not branched.

5. A dendritic macromolecule according to any one of claims 1, 2, or 4, wherein the core comprises at least one functional group selected from the group consisting of a hydroxyl group, a primary amine group, and a secondary amine group.

6. A dendritic macromolecule according to claim 5, wherein the core is a member selected from the group consisting of polymethylenediamines, glycols, tris-(1,3,5-aminomethyl)benzene, a (co)polymer, and a dendritic macromolecule.

7. A dendritic macromolecule according to any one of claims 1, 2, or 4, wherein a number of generations of branches are present, and further wherein the number of branches of the n$^{th}$ generation exceeds the number of reactive sites r$_c$ of the core and is no greater than the number of reactive sites r$_c$ of the core multiplied by r$^{n-1}$, where r is the number of reactive sites of each functional group.

8. A dendritic macromolecule according to claim 7, wherein the number of generations n is 1–10.

9. A dendritic macromolecule according to claim 7, wherein the chemical composition and/or structure of the branches of the n$^{th}$ generation differ from the chemical composition and/or structure of the (n+1)$^{th}$ generation.

10. A dendritic macromolecule whose branches contain units that correspond to the formula

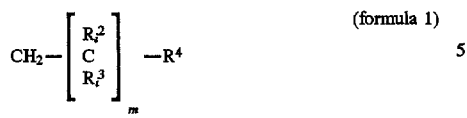 (formula 1)

where
i=1, 2 ... m
$R_i^2$ and $R_i^3$ is H or either linear or cyclic aliphatic, an aromatic, amide, ester or nitro group, $R_i^2$ and $R_i^3$ being the same or different, and $R_i^2$ and $R_i^3$ in different generations being the same or different m≧2,
$R^4$ is

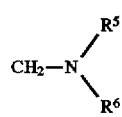

$R^5$ is H or a unit from the next generation
$R^6$ is H or a unit from the next generation,
where $R^5$ and $R^6$ in each

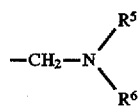

group and in each generation may be the same or different.

11. A dendritic macromolecule according to claim 10, wherein at least four units that correspond to formula 1 are present.

12. A process for preparing a dendritic macromolecule according to any one of claims 1, 4, or 10, said process comprising the steps of:
 a) reacting substantially every functional group of the core molecule with halogen cyanide units via a nucleophilic substitution reaction;
 b) reducing substantially every incorporated cyanide group to an amine; and
 c) reacting substantially every amine group with monomeric halogen cyanide units via a nucleophilic substitution reaction,
 wherein said steps b) and c) are conducted alternately and wherein the process is optionally interrupted either after said step a), b), or c).

13. A process according to claim 12, wherein said reacting steps a) and c) are conducted in solution, and wherein the solution contains a solvent selected from the group consisting of water, alcohols and carboxylic acids.

14. A process according to claim 13, wherein the solvent is ethanol.

15. A process for preparing a dendritic macromolecule according to any one of claims 1, 4, or 10, said process comprising the steps of:
 a) reacting substantially every functional group of the core molecule with halogen cyanide units via a nucleophilic substitution reaction;
 b) reducing substantially even/incorporated cyanide group to an amine; and
 c) reacting substantially every amine group with vinyl cyanide units via a Michael addition,
 wherein said steps b) and c) are conducted alternately and wherein the process is optionally interrupted either after said step a), b), or c).

16. A process according to claim 15, wherein the vinyl cyanide is selected from the group consisting of acrylonitrile, methacrylonitrile and fumarodinitrile.

17. A process according to claim 12, wherein the solvent in which reducing step takes place is an alcohol that contains an amount of ammonia, the molar ratio of ammonia to the number of cyanide groups being higher than 0.8 and lower than 50.

18. A process according to claim 12, wherein the catalyst used in reducing step is Raney nickel or Raney cobalt.

19. A process according to claim 12, wherein the weight ratio of the amount of catalyst to the cyanide-terminated dendrimer in said reducing step is lower than 50 wt %.

* * * * *